United States Patent
Smeets et al.

(10) Patent No.: US 9,465,615 B2
(45) Date of Patent: Oct. 11, 2016

(54) METHOD AND APPARATUS FOR BRANCH PREDICTION

(75) Inventors: Jean-Paul Smeets, Eindhoven (NL); Erik Rijshouwer, Nuenen (NL)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 355 days.

(21) Appl. No.: 14/128,876

(22) PCT Filed: Jul. 16, 2012

(86) PCT No.: PCT/EP2012/063867
§ 371 (c)(1),
(2), (4) Date: Apr. 24, 2014

(87) PCT Pub. No.: WO2013/014012
PCT Pub. Date: Jan. 31, 2013

(65) Prior Publication Data
US 2014/0229719 A1  Aug. 14, 2014

Related U.S. Application Data

(60) Provisional application No. 61/515,361, filed on Aug. 5, 2011.

(30) Foreign Application Priority Data

Jul. 22, 2011 (EP) .................... 11174969

(51) Int. Cl.
*G06F 9/06* (2006.01)
*G06F 9/38* (2006.01)

(52) U.S. Cl.
CPC .......... *G06F 9/3806* (2013.01); *G06F 9/3848* (2013.01)

(58) Field of Classification Search
CPC ...................................... G06F 9/00
See application file for complete search history.

(56) References Cited

U.S. PATENT DOCUMENTS

| 5,978,908 A | 11/1999 | Cumming et al. |
| 7,493,480 B2 * | 2/2009 | Emma ............ G06F 9/3806 712/240 |
| 7,519,798 B2 | 4/2009 | Chung |
| 2008/0168263 A1 | 7/2008 | Park |
| 2010/0169625 A1 | 7/2010 | Wang et al. |

OTHER PUBLICATIONS

International Search Report issued in corresponding International application No. PCT/EP2012/063867, date of mailing Sep. 14, 2012.
Kim, Cheol Hong et al., "A Power-Aware Branch Predictor by Accessing the BTB Selectively," Journal of Computer Science and Technology, vol. 20, No. 5, pp. 607-614, Sep. 2005.

* cited by examiner

*Primary Examiner* — Cheng-Yuan Tseng
(74) *Attorney, Agent, or Firm* — Patent Portfolio Builders PLLC (57) ABSTRACT

A branch prediction unit BPU (500) for prediction of a next taken branch instruction in a processing unit (100). The BPU (500) comprises a pattern history memory (504) comprising branch source addresses and branch indicators; a branch target buffer (506) comprising branch targets; and branch prediction logical circuit (502). By means of a search PC, the circuit finds in the memory a branch indicator indicating a predicted taken branch instruction. The circuit selects a first found branch indicator as an indication of a first predicted taken branch instruction. Using the first found branch indicator, the circuit retrieves from the memory, a branch source address of the first predicted taken branch instruction. When the retrieved branch source address is the branch source address nearest to the search PC, the circuit outputs as next PC a branch target retrieved from the buffer. Then the prediction stops.

11 Claims, 6 Drawing Sheets

METHOD AND APPARATUS FOR BRANCH PREDICTION

TECHNICAL FIELD

Embodiments herein relate to a branch prediction unit and a method therein. In particular, embodiments relate to prediction of a next taken branch instruction.

BACKGROUND

Microprocessors are electronic devices that can perform a variety of computing operations in response to instructions that implement a computer program. A common technique for implementing computer programs is to send multiple instructions in a predetermined sequence to an execution unit of the microprocessor. The execution unit executes the instructions in accordance with the predetermined sequence. The order in which instructions are executed is referred to as control flow. In some circumstances, control flow does not follow a linear path but jumps to an instruction which is not the next instruction in the sequence. Instructions that cause jumps in the control flow are referred to as control instructions, an example of such a control instruction is the branch instruction. When a branch instruction is executed, the execution unit jumps to the target instruction identified by the branch instruction and executes the target instruction next, rather than the next sequential instruction.

Microprocessors often process instructions using several processing stages, which can include an instruction fetch stage in which instructions are fetched from an instruction memory; an instruction decoding stage in which the fetched instructions are decoded; an instruction execution stage in which the instructions are executed, and a writeback stage in which the results of the executed instructions are written back to some kind of memory. To improve the speed at which multiple instructions are processed through the various stages, some microprocessors use a technique known as pipelining.

In a so called pipelined processor comprising multiple processing stages, the multiple processing stages concurrently perform different parts of the process on several different instructions. In an exemplifying pipelined processor, a first instruction is processed by the first stage of the pipelined processor in a first clock cycle. In a second clock cycle, the first instruction is processed in a second stage of the pipelined processor and a second instruction is processed by the first stage. In a third clock cycle, the first instruction is processed by a third stage of the pipelined processor, the second instruction is processed by the second stage and a third instruction is processed by the first stage. This procedure continues for all instructions until they have been processed by the total number of processing stages.

In high performance Central Processing Units (CPUs), pipelines with a large number of processing stages are needed to achieve a high clock frequency. These pipelined processors are efficient at executing linear code, i.e., instructions in a predetermined sequential order, but have difficulties in executing branch instructions. The changes in control flow caused by branch instructions can lead to substantial loss of performance. For example, an error in the branch prediction, such as a wrong prediction of the next instruction, may cause the processor to stall. A wrong prediction may also cause the currently pipelined sequence of instructions to be thrown out or "flushed" from the pipelined processor, and a new sequence of instructions must be loaded into the pipeline. A flush of the pipeline results in stall cycles for the execution stage and therefore degrades the performance of the processor. The number of stalls resulting from a flush is proportional to the pipeline depth and is referred to as the misprediction penalty.

To improve the performance of a pipelined processor, the first pipeline stages or "frontend" of the pipelined processor are often made speculative. This means that the frontend of the pipelined processor is configured to predict the next address in the instruction memory at which to continue fetching instructions without knowing the architectural state (i.e. the state of the processor after execution of all previous instructions) or even having fully decoded the already fetched instructions.

One of the main functions of a speculative frontend is the prediction of branches. Branch prediction consists of two tasks: 1) predicting if there is a branch that should be taken, and 2) predicting where to branch to, i.e., predicting the branch target.

There are two main attributes of branches that have consequences for the prediction function:
1. The branch condition. Conditional branches are only taken when the condition is fulfilled, whereas branches without a branch condition are always taken.
2. The branch target type. Branches that have the branch target address encoded as part of the branch instruction are referred to as direct branches. When the branch instruction is decoded the target is known with certainty. Branches that refer to a storage location for the branch target are called indirect branches. The value stored at the storage location that is to be used as the branch target can change up until the last instruction before the branch instruction.

In case of fixed instruction sizes where a small number of instructions are fetched each cycle, the positions of the instructions in the memory word are known and therefore a limited amount of decoding can be done on this data. Basically a small number of partial decoders are used in parallel. These partial decoders can identify branches very early in the pipeline. In this case only for indirect or conditional branches the branch needs to be predicted.

In case of variable instruction sizes the instructions can start at arbitrary addresses in the instruction memory. In such case partial decoding becomes too costly because all possible positions of the instructions in the memory word must be tried simultaneously. This means that even for direct branches the branch target will only be available in the decode stages and therefore the branch target has to be predicted for all branch instructions.

US 2008/0168263 to Park discloses a pipelined processor comprising an instruction fetch unit receiving an instruction from a memory. The instruction fetch unit provides the received instruction to an instruction decoder unit that decodes the instruction and provides the decoded instruction to an execution unit for execution. In addition to providing the received instruction to the decoder unit, the instruction fetch unit provides an instruction portion to a branch prediction unit. The instruction portion comprises an instruction address. By means of the instruction portion the branch prediction unit predicts a next instruction and provides a predicted address to the instruction fetch unit. The instruction fetch unit fetches the instruction corresponding to the predicted address from the memory and loads it onto the pipeline. The branch prediction unit also receives a definite next address from the execution unit when the instruction has been executed and by means of this definite next address, the branch prediction unit can determine whether the previously predicted next instruction was the correct next instruction. If the prediction was correct, the pipeline continues forward with the pipelined sequence of instructions. However, if the prediction was incorrect, the processor flushes the pipeline and loads the instruction indicated by the next address indication.

U.S. Pat. No. 7,519,798 to Chung discloses a branch prediction system comprising a processor core, a branch predictor and a branch target buffer. The processor core may output branch information to the branch predictor. The branch information may represent an address of a current instruction and/or may indicate whether a previous instruction is a branch instruction. The branch predictor may predict a branch of the current instruction using the address of the current instruction, and may output a final branch prediction result to the processor core. By means of the final branch prediction result the branch predictor may indicate to the processor core when to fetch the branch address from the branch target buffer.

A drawback with the methods and apparatuses disclosed in US 2008/0168263 and U.S. Pat. No. 7,519,798 is that they are based on the operation of a single instruction at a time, i.e. at each clock cycle, causing these methods and apparatuses to be both time consuming and power consuming.

US 2010/0169625 to Wang et al. discloses a pipeline microprocessor comprising an instruction fetch stage in which a plurality of instructions are fetched from an instruction cache for further processing and execution. Instructions are divided into control flow instructions and non-control flow instructions and it has been determined that only control flow instructions can be branch instructions. The microprocessor comprises further a branch target buffer, a branch history table and a control instruction identification unit. The control instruction identification unit is configured to identify control instructions in the fetched group of instructions. Once the control instructions have been identified, access to the branch target buffer and the branch history table can be limited so that only the control flow instructions are looked up in the branch target buffer.

A drawback with the method and apparatus disclosed in US 2010/0169625 is that the instruction type, i.e. control flow instruction or non-control flow instruction, has to be known, requiring an extra analysis step to be performed by the control instruction identification unit causing also this method and apparatus to be unnecessary time and power consuming.

SUMMARY

Most of the prior art branch prediction apparatuses and methods comprise high performance computer processing units having high power consumption. Further, in the prior art, the prediction whether or not a branch is taken and the prediction where to branch to are usually done in parallel. This is expensive in terms of power consumption and does not take into account that only for the taken branches the branch target needs to be calculated. Specifically when 2-way associative structures or higher associative structures are used for holding the branch target the power consumption becomes high.

It is therefore an object of embodiments herein to provide a way of improving performance of a pipelined processing unit.

According to a first aspect of embodiments herein, the object is achieved by a method in a branch prediction unit for prediction of a next taken branch instruction in a processing unit comprising the branch prediction unit. A program counter corresponding to a start address of an instruction memory word is received and a search program counter based on the received program counter is determined. In a pattern history memory comprising a number of branch source addresses and a number of branch indicators, at least one branch indicator configured to indicate at least one predicted taken branch instruction that is comprised in an execution path, is found. This is performed by means of the search program counter. Then a first found branch indicator is selected as an indication of a first predicted taken branch instruction in the execution path. By means of the first found branch indicator a branch source address of the first predicted taken branch instruction is retrieved from the pattern history memory. When the retrieved branch source address is the nearest branch source address to the search program counter, a branch target buffer is indexed by means of the retrieved branch source address, and a branch target retrieved from the branch target buffer is outputted as a next program counter. Then the prediction of a next taken branch instruction is stopped.

According to a second aspect of embodiments herein, the object is achieved by a branch prediction unit for prediction of a next taken branch instruction in a processing unit comprising the branch prediction unit. The branch prediction unit comprises a pattern history memory, which pattern history memory comprises a number of branch source addresses and a number of branch indicators. The branch indicator is configured to indicate at least one predicted taken branch instruction for a branch source address. The branch prediction unit comprises further a branch target buffer comprising a number of branch targets. A branch prediction logical circuit connected to the pattern history memory and to the branch target buffer is also comprised in the branch prediction unit. The branch prediction logical circuit is configured to receive a program counter corresponding to a start address of an instruction memory word and to determine a search program counter based on the received program counter. By means of the search program counter, the branch prediction logical circuit is configured to find in the pattern history memory at least one branch indicator. The at least one branch indicator is configured to indicate at least one predicted taken branch instruction that is comprised in an execution path. The branch prediction logical circuit is further configured to select a first found branch indicator as an indication of a first predicted taken branch instruction in the execution path. By means of the first found branch indicator, the branch prediction logical circuit is configured to retrieve from the pattern history memory, a branch source address of the first predicted taken branch instruction. When the retrieved branch source address is the nearest branch source address to the search program counter, the branch prediction logical circuit is configured to index the branch target buffer by means of the retrieved branch source address and to output a retrieved branch target from the branch target buffer as a next program counter. Then the branch prediction logical circuit is configured to stop prediction of a next taken branch instruction.

Since the branch target buffer is only indexed and accessed when the nearest branch source address has been found, no unnecessary accesses to the branch target buffer are performed. Further, since the branch prediction unit operates autonomously and separated from the instruction fetch unit, the branch prediction does not interfere with instruction fetching and therefore does not negatively influence the performance of the instruction fetch unit. This results in an improved performance of the pipelined processing unit.

An advantage with embodiments herein is that the power consumption of the branch prediction unit is reduced.

A further advantage with embodiments herein is that it is easier to keep up with a fast working pipeline processing unit since the search does not need to be exhaustive.

A further advantage with embodiments herein is that they provide for simultaneous handling of a plurality of instructions.

A further advantage with embodiments herein is that the search can be paused when the next predicted branch instruction has been found. This leads to reduced power consumption of the branch prediction unit.

A further advantage with embodiments herein is that the size of the pattern history memory and the branch target buffer can be tuned or optimized to the size required by the taken branch instructions.

BRIEF DESCRIPTION OF THE DRAWINGS

Examples of embodiments herein are described in more detail with reference to attached drawings in which.

DETAILED DESCRIPTION

Embodiments will be exemplified in the following non-limiting description.

Embodiments herein provide for the prediction of a next taken branch instruction in a pipelined processing unit in order to avoid stalling of the processing unit and in order to avoid flushing of the processing unit due to the fact that a next instruction in the pipeline sequence is not the correct instruction.

The branch prediction may be performed for all types of branch instructions. This means that the branch instruction may be a direct branch instruction, an indirect branch instruction, a conditional branch instruction, an unconditional branch instruction or a combination thereof, i.e., a direct conditional branch instruction, a direct unconditional branch instruction, an indirect conditional branch instruction, or an indirect unconditional branch instruction.

Figure 1:
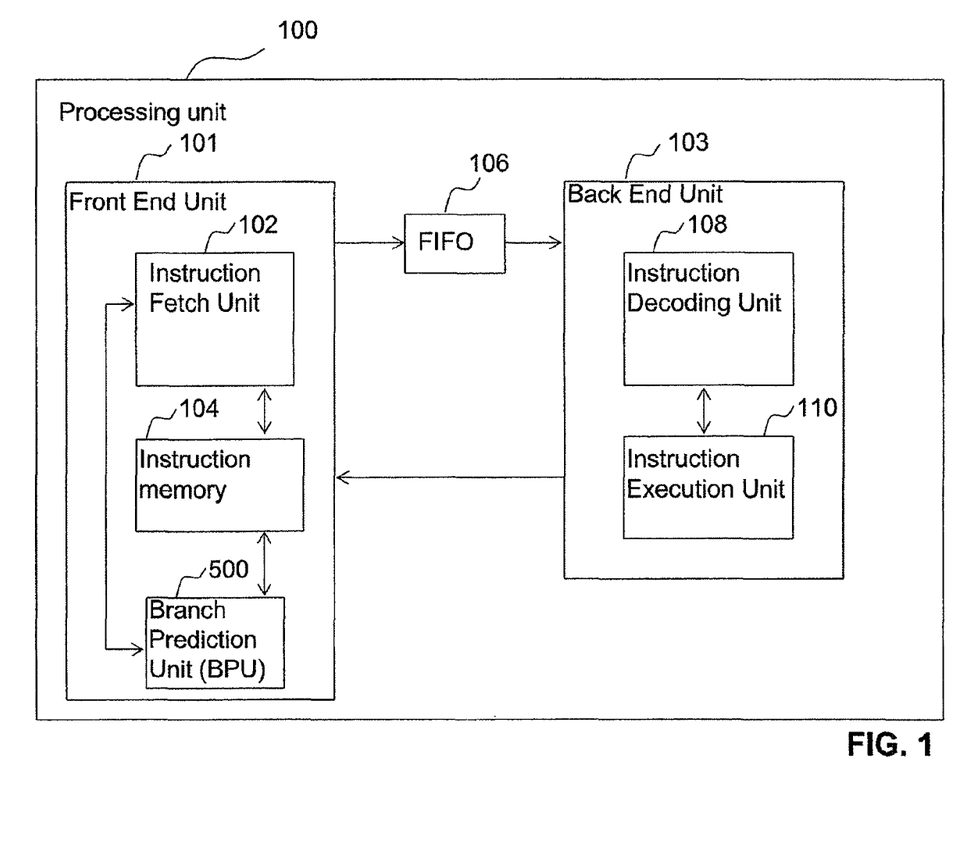
FIG. 1 is a schematic block diagram illustrating embodiments of a processing unit.

FIG. 1 depicts a processing unit 100 in which embodiments herein may be implemented. The processing unit 100 is a pipelined processing unit 100. The term "processing unit" when used herein comprises any digital logic device or system capable of executing or responding to an instruction sequence. The term comprises for example Central Processing Units (CPUs), microprocessors, Digital Signal Processors (DSPs), Reduced Instruction Set Computer (RISC) processors, vector processors, and Single-Instruction-Multiple-Data (SIMD) processors.

The processing unit 100 comprises a front end unit 101 and a back end unit 103.

The front end unit 101 is configured to perform processing of instructions in front end processing stages of the pipelined processing unit 100. The front end unit 101 comprises an instruction fetch unit 102 configured to receive a program counter (pc).

A program counter is a register indicating where the processing unit 100 is in its processing of instructions in a sequence of instructions. The program counter is configured to hold an instruction address of a next instruction to be fetched or an address of the instruction memory word containing one or more instructions among which a next instruction to be fetched.

The instruction fetch unit 102 is configured to fetch instructions from an instruction memory 104 based on the received program counter. The instruction fetch unit 102 is further configured to store the fetched instructions in a First In, First Out (FIFO) memory 106 connected to the instruction fetch unit 102.

In a FIFO memory 106, the first element stored is also the first element to be removed from the FIFO memory 106 for processing thereof. Further, the second element stored after the first element is the second element to be removed from the FIFO element and processed, etc. Thus, in the same sequential order as elements are stored in the FIFO memory 106, they are also removed from the FIFO memory 106.

The instruction memory 104 may be comprised in the front end unit 101 and is configured to store instructions. In some embodiments, the instruction memory 104 is arranged in the instruction fetch unit 102. In other embodiments, the instruction memory 104 is arranged in communication with the instruction fetch unit 102. Further, in some embodiments, the instruction memory 104 is arranged external to the processing unit 100 and in communication with the processing unit 100.

Figure 5:
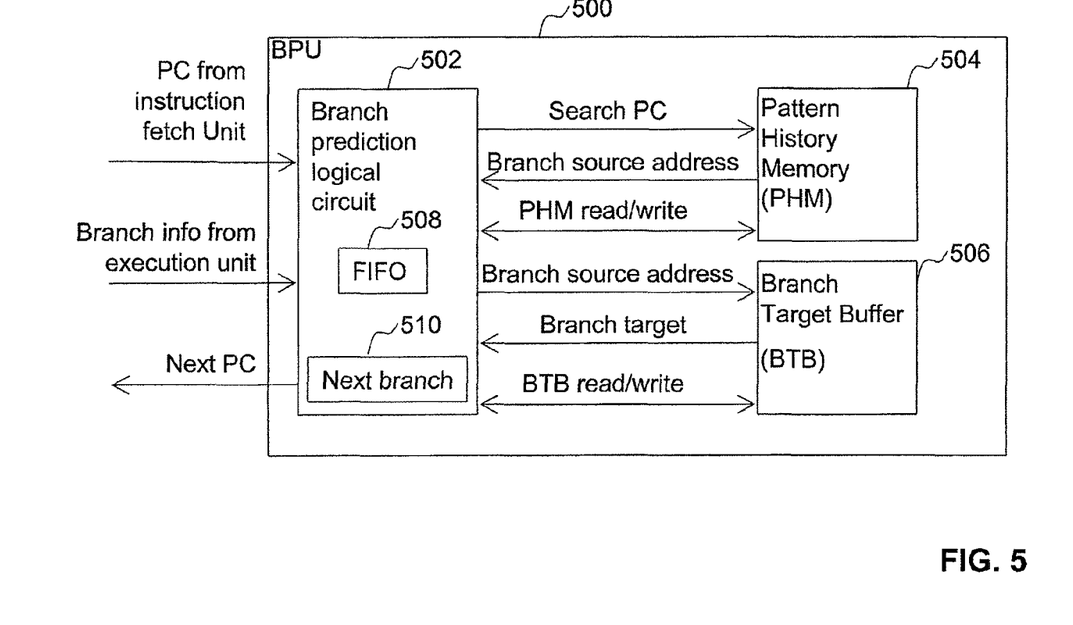
FIG. 5 is a schematic block diagram illustrating embodiments of a branch prediction unit.

The front end unit 101 comprises further a branch prediction unit (BPU) 500 configured to perform branch predictions based on the received program counter. As illustrated in FIG. 5, the branch prediction unit 500 comprises branch prediction logical circuit 502, a pattern history memory 504, a branch target buffer 506, a FIFO memory 508, and a next branch memory 510. The branch prediction unit 500 will be described in more detail below.

The pattern history memory 504 and the branch target buffer 506 may be realized as processor caches configured to store and provide frequently used information. The pattern history memory 504 and the branch target buffer 506 may be configured to provide information in a single clock cycle. The pattern history memory 504 and the branch target buffer 506 will be described in more detail below and with reference to FIG. 6.

The back end unit 103 is configured to perform processing of instructions in back end processing stages of the processing unit 100. The back end unit 103 is configured to retrieve instructions to be processed from the FIFO memory 106.

The back end unit 103 comprises an instruction decoding unit 108 configured to decode instructions as is well-known in the art. The instruction decoding unit 108 is further configured to check whether an instruction following a direct branch instruction in the FIFO memory 106 is the correct instruction. The direct branch instruction may be a conditional direct branch instruction or an unconditional direct branch instruction. Since a direct branch instruction has the branch target encoded as part of the instruction, the instruction decoding unit 108 will know the branch target when the instruction has been decoded. Then the instruction decoding unit 108 can compare the branch target with the instruction address of the next instruction in the FIFO memory 106. When the branch target does not match the address of the next instruction, the next instruction is not the correct instruction and the pipeline, e.g. the FIFO memory 106, has to be flushed as previously described.

Furthermore, the instruction decoding unit 108 may be configured to provide branch information to the front end unit 101.

The back end unit 103 further comprises an instruction execution unit 110 configured to execute decoded instructions. The instruction execution unit 110 is further configured to check whether an instruction following a branch instruction, i.e., an indirect branch instruction or a direct branch instruction, in the FIFO memory 106 is the correct instruction.

An indirect branch instruction may be a conditional indirect branch instruction or an unconditional indirect branch instruction. Since an indirect branch instruction refers to a storage location for the branch target, the indirect branch instruction has to be executed before the branch target is known. Thus, the instruction execution unit 110 will know the branch target when the instruction has been executed. Then the instruction execution unit 110 can compare the branch target with the instruction address of the next instruction in the FIFO memory 106.

A direct branch instruction may be a conditional direct branch instruction or an unconditional direct branch instruction. Since a direct branch instruction has the branch target encoded as part of the instruction, the instruction decoding unit 108 will know the branch target after the instruction has been decoded. In case of an unconditional direct branch instruction, the comparison of the branch target with the instruction address of the next instruction in the FIFO memory 106 can already take place after the decoding of the branch instruction. For a conditional direct branch instruction the comparison with the instruction address of the next instruction in the FIFO memory 106 can only be performed after the conditional direct branch instruction has been executed.

When the branch target matches the address of the next instruction the next instruction is the correct instruction. When the branch target does not match the address of the next instruction, the next instruction is not the correct instruction and the pipeline, e.g. the FIFO memory 106, has to be flushed.

Furthermore, the instruction execution unit 110 is configured to provide branch information to the front end unit 101.

The branch information thus provided to the front end unit 101 relates to decoded branch instructions or executed branch instructions and may comprise information of the type of the branch, e.g. conditional or unconditional branch and direct or indirect branch, the instruction address of the branch source, the instruction address of the branch target, i.e. the address of the target instruction, and/or information about whether the branch has been taken or not. The branch prediction unit 500 may use the branch information to update the pattern history memory 504.

Figure 2:
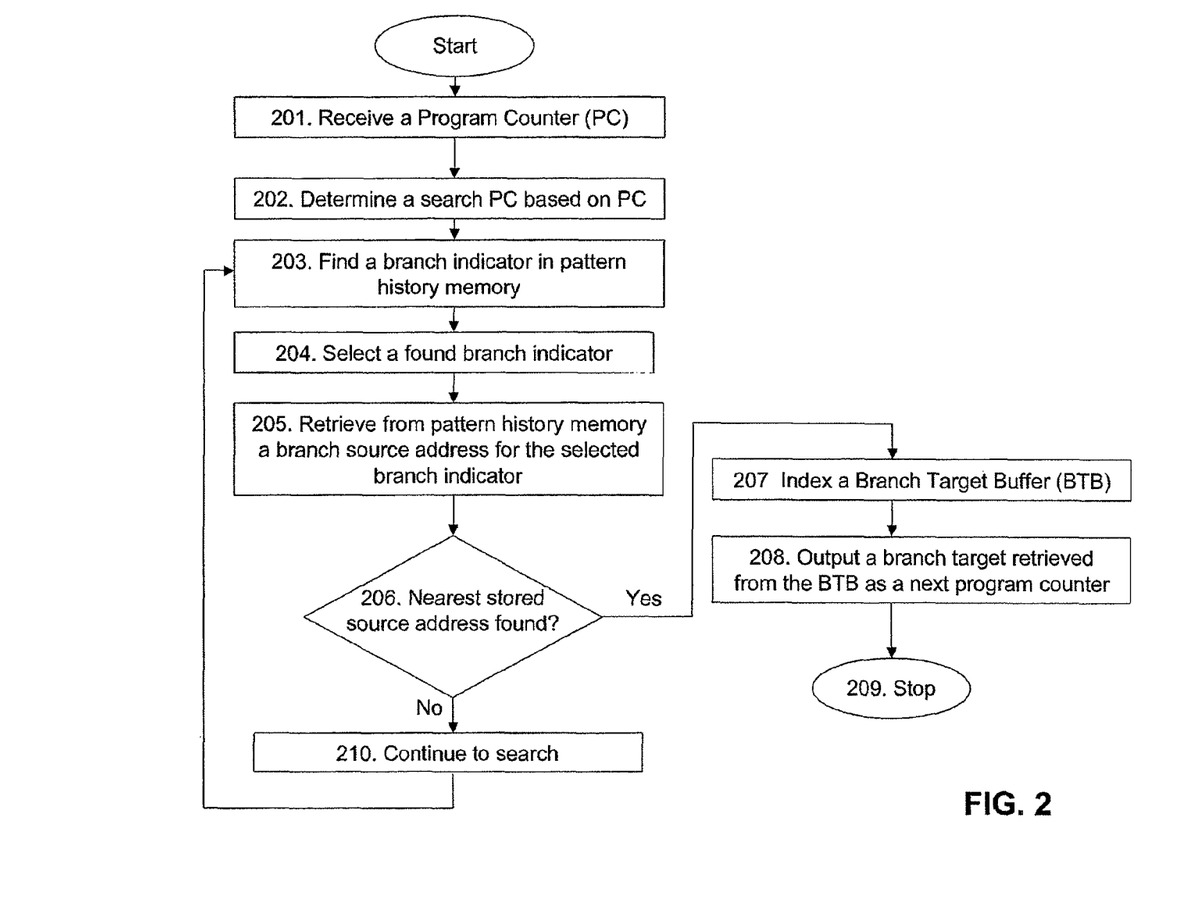
FIG. 2 is a flow chart depicting embodiments of a method in a branch prediction unit.

Embodiments of a method in the branch prediction unit 500 for prediction of a next taken branch instruction in the processing unit 100 will now be described with reference to the flowchart depicted in FIG. 2, with further reference to FIGS. 5 and 6. As mentioned above, the branch prediction unit 500 is comprised in the processing unit 100. The method comprises the following actions executed during two clock cycles of the processing unit 100.

If for a search program counter, an instruction branch exists in the administration, of the branch prediction unit 500, i.e. is registered in the branch prediction unit 500 for that search program counter, it may take the branch prediction unit 500 one additional clock cycle to provide the branch prediction. This means that when the instruction fetch unit 102 and the branch prediction unit 500 are both set to the same address, i.e. they are having the same program counter, it may take the branch prediction unit 500 one additional clock cycle to provide the branch prediction for that address. This could for example be the case after a pipeline flush and means that if a taken instruction branch exists in the instruction memory word that corresponds with that address, the instruction fetch unit 102 will already (incorrectly) have moved on to the next instruction word. This incorrectly fetched instruction word may be flushed from the pipeline according to some embodiments. Note that this problem only exists when the branch prediction unit 500 did not have the opportunity to run ahead of the instruction fetch unit 102. Typically the instruction fetch unit 102 may be stalled frequently since the instruction fetch unit 102 works at one (1) instruction word per clock cycle, while the instruction decoding unit 108 may only process one (1) instruction per clock cycle. Having multiple instructions in a memory word may therefore lead to stalls of the instruction fetch unit 102. During these stalls the branch prediction unit 500 may run ahead of the instruction fetch unit 102 and that typically compensates for the one clock cycle of additional latency to produce the prediction, according to some embodiments.

The actions are further performed separated from and concurrently with the instruction fetching of the processing unit 100. This means that the actions of predicting a next taken branch is performed independent of and simultaneously with the actions of fetching instructions. Thereby, branch prediction may be performed independently from, and simultaneously with, instruction fetching according to some embodiments. However, it should be understood that the actions of predicting a next taken branch may be carried out in another suitable order than described below.

Action 201

A program counter corresponding to a start instruction address of an instruction memory word is received. The start instruction address is the instruction address of the first instruction comprised in the instruction memory word. The instruction memory word may comprise a number of instructions, each of which instruction may be a branch instruction. This means that the instruction memory word may comprise a plurality of branch instructions. Further, the instructions may have a fixed instruction size or may have a variable instruction size. The instruction memory word may be comprised in the instruction memory 104.

In some embodiments, the prediction of a next taken branch instruction is initiated by a new branch signal sent to the branch prediction unit 500. The new branch signal indicates that a prediction of a next taken branch instruction has to be performed, e.g. an indication of a program start, of a pipeline flush or of a corrected program counter, or an indication that an instruction branch is predicted as taken, or that an instruction branch has been incorrectly predicted. Basically, a new branch signal is sent every time the program counter starts a new linear sequence of increments. The back end unit 103 may send the new branch signal to the branch prediction unit 500 when the current prediction is used to fetch the next instruction or a flush has occurred in the pipeline.

Action 202

Determine a search program counter (search pc) based on the received program counter.

In some embodiments, the search program counter corresponds to or is equal to the program counter.

Action 203

By means of the search program counter, at least one branch indicator is found in a pattern history memory 504.

The branch indicators comprised in the pattern history memory 504 are referred to as $BI_{0,0}$-$BI_{N-1,K}$, wherein N is the number of branch source addresses $A_0, A_1, \ldots A_{N-1}$ comprised in the pattern history memory 504, and K is the number of branch indicators for each branch source address $A_0, A_1, \ldots A_{N-1}$. Thus, the branch indicators for the branch source address $A_0$ may be referred to as $BI_{0,0}$, $BI_{0,1}$, $BI_{0,2}, \ldots BI_{0,K}$, and the branch indicators for the branch source address $A_{N-1}$ may be referred to as $BI_{N-1,0}$, $BI_{N-1,2}, \ldots BI_{N-1,K}$. However, it should be understood that the number of branch indicators for each branch source address may be different for the different branch source addresses.

In some embodiments, the pattern history table 504 is initially empty comprising a zero in every entry. However, in some other embodiments, all entries may be prefilled according to a predetermined schema based on e.g. a static code scan by a compiler.

The pattern history memory 504 may comprise the at least one branch indicator $BI_{0,0}$-$BI_{N-1,K}$ relating to at least one previously taken branch instruction, i.e. to at least one branch instruction taken in the history, thereof the name pattern history. This history information can be used in the prediction of upcoming branch instructions, meaning that the branch prediction is based on previously taken branch instructions.

The at least one branch indicator $BI_{0,0}$-$BI_{N-1,K}$ is found by searching the pattern history memory 504 by means of the search program counter.

The at least one branch indicator $BI_{0,0}$-$BI_{N-1,K}$ is configured to indicate at least one predicted taken branch instruction that is comprised in an execution path.

In some embodiments, the execution path starts at the program counter and ends at a last instruction comprised in the instruction memory word.

The at least one branch indicator $BI_{0,0}$-$BI_{N-1,K}$ may be found concurrently for a plurality of instructions comprised in the instruction memory word. This means that the pattern history memory 504 has to be searched simultaneously for the plurality of instructions.

In some embodiments, the search program counter is mapped to a pattern history index i. By means of the pattern history index i, the at least one branch indicator $BI_{0,0}$-$BI_{N-1,K}$ is found. The at least one branch indicator $BI_{0,0}$-$BI_{N-1,K}$ is comprised in the entry of the pattern history memory 504 corresponding to the pattern history index i.

The search program counter may be mapped to a single pattern history index i or to multiple pattern history indices i. The mapping will be described in more detail below.

However, it may be noted that according to some embodiments, when there are no branches to be found in the pattern history memory 504, the search may end and the branch prediction unit 500 may enter idle mode as soon as it arrives at that conclusion.

Action 204

A first found branch indicator $BI_{0,0}$-$BI_{N-1,K}$ is selected as an indication of a first predicted taken branch instruction in the execution path. This means that the first found branch indicator among all the found branch indicator(-s) is considered as an indication of the first predicted taken branch instruction in the execution path.

Action 205

By means of the first found branch indicator $BI_{0,0}$-$B_{N-1,K}$, a branch source address $A_0, \ldots, A_{N-1}$ is retrieved from the pattern history memory 504. The branch source address $A_0, \ldots, A_{N-1}$ is the branch source address $A_0, \ldots, A_{N-1}$ of the first predicted taken branch instruction. The branch source address of the first predicted taken branch is used to check whether the first predicted taken branch instruction is a first predicted taken branch instruction for the search program counter, which will be checked in action 206.

Action 206

In this action it is checked whether the retrieved branch source address $A_0, \ldots, A_{N-1}$ is the nearest found branch source address to the search program counter or not. This is performed to check if the first predicted taken branch instruction is a first predicted taken branch instruction for the search program counter.

Action 207

When the retrieved branch source address $A_0, \ldots, A_{N-1}$ is the nearest branch source address to the search program counter, a branch target buffer 506 comprising a number of branch targets is indexed by means of the retrieved branch source address $A_0, \ldots, A_{N-1}$. This means that the retrieved branch source address is used for accessing the correct entry of the branch target buffer in order to be able to find the branch target, cf. action 208.

In some embodiments this action is performed by indexing of the branch target buffer 506 by mapping the retrieved branch source address $A_0, \ldots, A_{N-1}$ to a branch target buffer index j. Further, by means of the branch target buffer index j, the branch target $Target_0, \ldots, Target_{M-1}$ for the retrieved branch source address $A_0, \ldots, A_{N-1}$ is found in the branch target buffer 506, wherein M is the number of branch targets stored in the branch target buffer 506. The branch target $Target_0, \ldots, Target_{M-1}$ is comprised in the entry of the branch target buffer 506 corresponding to the branch target buffer index j. The mapping will be described in more detail below.

In some embodiments, the retrieved branch source address $A_0, \ldots, A_{N-1}$ is mapped to a single branch target buffer index j or to multiple branch target buffer indices j.

The branch target $Target_0, \ldots, Target_{M-1}$ may comprise the instruction address of the next predicted taken branch instruction or a pointer to the next predicted taken branch instruction.

Action 208

A branch target $Target_0, \ldots, Target_{M-1}$ retrieved from the branch target buffer 506 is outputted as a next program counter. In some embodiments, the branch target $Target_0, \ldots, Target_{M-1}$ is outputted to the instruction fetch unit 102 that fetches the relevant instruction and stores it in the FIFO memory 106.

Action 209

When the branch target has been outputted as the next program counter, the prediction of a next taken branch instruction is stopped or paused.

In some embodiments, the prediction idles until a new prediction is initiated by a new branch signal as described above under action 201. This means that the power consumption in the branch prediction unit 500 is reduced during the idle period.

The pattern history memory 504 and/or the branch target buffer 506 is updated during the period when it is not predicting a next taken branch instruction. The updating procedure will be described in more detail below.

Action 210

When the retrieved branch source address $A_0, \ldots, A_{N-1}$ is not known with certainty to be nearest branch source address to the search program counter, the retrieved branch source address $(A_0, \ldots, A_{N-1})$ is stored in a next branch memory 510, as a predicted taken branch for a subsequent instruction in the execution path, and the actions 203, 204, 205, 206, 210 are continued until it is certain the nearest branch source address to the search program counter is found, according to some embodiments.

By a subsequent instruction is meant an instruction that is subsequent to the instruction corresponding to the search program counter in action 201.

In a first iteration, a second found branch indicator indicating a second predicted taken branch instruction in the execution path is selected in action 204. In action 205 the branch source address of the second predicted taken branch instruction is retrieved from the pattern history memory 504. When the branch source address of the second predicted taken branch instruction is not the nearest branch source address to the search program counter, a second iteration may start in action 203. When the branch source address of the second predicted taken branch instruction is the nearest branch source address to the search program counter, the branch target buffer 506 is indexed by means of the retrieved branch source address in action 207. In action 208 a branch target retrieved from the branch target buffer 506 is output as a next program counter, and in action 209 the branch prediction unit stops the prediction of a next taken branch instruction.

Example of an Embodiment of a Method in a Branch Prediction Unit 500

Given a certain program counter, the branch prediction unit 500 searches for the first predicted taken branch on a linear execution path starting from the program counter.

The program counter is the start address of the search and the search program counter points to the instruction word address that is being searched in a particular clock cycle.

A search for the first, herein also referred to as the nearest, instruction branch occurring on the execution path that starts at the program counter is performed. The search program counter is mapped to an index i of the pattern history memory 504 by means of a first mapping function. An example of a first mapping function for a pattern history memory 504 having eight (8) entries, wherein each entry contains max four (4) branch indicators and wherein every instruction branch fits in a byte and which pattern history memory 504 is byte addressed, is i=((program counter)/4) modulo 8. Since there are many more addresses than indices, every index i may be associated with a plurality of search program counters.

Assume the pattern history memory 504 has the content illustrated in Table 1 below. As illustrated, the index i can take a value between 0 and 7. Further, the branch source address $A_1$ has a value of 4, the branch source address $A_2$ has a value of 72, and the branch source address of $A_7$ has a value of 60. Furthermore, the pattern history memory 504 illustrated in Table 1, comprises for each index i four branch indicators, $BI_{i,0}$-$BI_{i,3}$, each branch indicator corresponding to an offset relative the branch source address, $A_i$. In this example, branch indicators $BI_{0,0}$-$BI_{7,0}$ correspond to an offset of +0 byte, branch indicators $BI_{0,1}$-$BI_{7,1}$ correspond to an offset of +1 byte, branch indicators $BI_{0,2}$-$BI_{7,2}$ correspond to an offset of +2 bytes, and branch indicators $BI_{0,3}$-$BI_{7,3}$ correspond to an offset of +3 bytes relative the respective branch source address $A_0$-$A_7$. In table 1, instruction branches are shown as BR.

TABLE 1

Exemplifying content of a pattern history memory 504.

| index i | Branch source address, $A_i$ | Branch indicators, BI (offsets) | | | |
| --- | --- | --- | --- | --- | --- |
| | | +0 | +1 | +2 | +3 |
| 0 | 4 | | | BR | |
| 1 | 75 | | | | BR |
| 2 | | | | | |
| 3 | | | | | |
| 4 | | | | | |
| 5 | | | | | |
| 6 | | | | | |
| 7 | 60 | BR | BR | | |

Further, assume that the program counter is 6, that a new branch signal is active and received in the branch prediction unit 500. This relates to action 201. Then the search program counter 6 is mapped to index 1, by means of the first mapping function described above. Therefore, at clock cycle 0, the branch prediction unit 500, by means of the search program counter, starts searching for a branch indicator indicating an instruction branch at index 1, offset +2. This relates to actions 202 and 203.

Table 2 below schematically illustrates the search program counter, the index i, the offset and the taken action for the following clock cycles 1-7.

As shown, in clock cycle 1, the search program counter is 6, the index is 1 and the offset is 2, and no instruction branch is found. Therefore, the branch prediction unit 500 continues to search.

In clock cycle 2, the search program counter is 8, the index is 2 and the offset is 0. In this clock cycle an instruction branch BR at the branch address 75 is found. This instruction branch is stored in a next branch memory 510 as the nearest found instruction branch.

In clock cycle 3, the search program counter is 12, the index is 3 and the offset is 0, and no instruction branch is found. Therefore, the branch prediction unit 500 continues to search.

In clock cycle 4, the search program counter is 16, the index is 4 and the offset is 0, and no instruction branch is found. Therefore, the branch prediction unit 500 continues to search.

In clock cycle 5, the search program counter is 20, the index is 5 and the offset is 0, and no instruction branch is found. Therefore, the branch prediction unit 500 continues to search.

In clock cycle 6, the search program counter is 24, the index is 6 and the offset is 0, and no instruction branch is found. Therefore, the branch prediction unit 500 continues to search.

In clock cycle 7, the search program counter is 28, the index is 7 and the offset is 0. In this clock cycle an instruction branch BR at the branch address 60 is found. This instruction branch is compared with the branch stored in the next branch memory and since the branch instruction is nearer to the program counter from action 201 than the branch stored in the next branch memory, the newly found branch instruction is stored in the next branch memory as the nearest found instruction branch. After 7 clock cycles all entries of the exemplifying pattern history memory 504 have been visited, the search concludes that the branch source address of 60 is the branch source address nearest to the search program counter. This relates to the actions 203, 204, 205, 206, and 210.

TABLE 2 schematic illustration of the search program counter, the index i, the offset and the taken action for the clock cycles 1-7

| Clock cycle | Search PC | Index i | Offset | Action |
|---|---|---|---|---|
| 1 | 6 | 1 | 2 | continue search |
| 2 | 8 | 2 | 3 | found BR at 75, store as nearest found |
| 3 | 12 | 3 | 0 | continue search |
| 4 | 16 | 4 | 0 | continue search |
| 5 | 20 | 5 | 0 | continue search |
| 6 | 24 | 6 | 0 | continue search |
| 7 | 28 | 7 | 0 | found BR at 60, store as nearest found, all entries visited, report 60 |

Now when the branch at address 75 would have been a branch at address 9, then table 2 above would have looked like table 3 below:

TABLE 3

| Clock cycle | Search PC | Index i | Offset | Action |
|---|---|---|---|---|
| 1 | 6 | 1 | 2 | continue search |
| 2 | 8 | 2 | 0 | found BR at 9, match with Search PC, nearest found, report 9 |

Thus, a search ends or is paused when all entries in the pattern history memory 504 have been visited or when an instruction branch has been found for which the branch source address $A_i$ matches (ignoring offsets/last x bits) the Search PC (implies nearest branch has been found). The nearest branch, if any, will be used to index the branch target buffer 506, whereby a branch target is retrieved from the branch target buffer 506 and outputted as a next program counter. The indexing of the branch target buffer 506 is performed by first translating the nearest branch source address to an index j according to a second mapping function. An example of a second mapping function is: j=(branch source address) modulo 64 for a branch target buffer 506 comprising 64 entries. This relates to actions 207-209.

Updating of Pattern History Memory 504 and Branch Target Buffer 506

In some embodiments, cf. e.g. FIG. 5, at least one pattern history update to the pattern history memory 504 is buffered in a FIFO memory 508 and the pattern history memory 504 is updated with the buffered at least one pattern history update when the pattern history memory 504 is not searched.

The at least one pattern history update may relate to at least one new or updated branch source address or to at least one new or updated taken branch instruction received from the back end unit 103, i.e., received from the instruction decoding unit 108 and/or from the instruction execution unit 110.

In some embodiments, at least one branch target buffer update to the branch target buffer 506 is buffered in the FIFO memory 508 and the branch target buffer 506 is updated with the buffered at least one branch target buffer update when the branch target buffer 506 is not indexed.

The at least one branch target buffer update relates to at least one new or updated branch target $Target_0, \ldots, Target_{M-1}$.

The at least one pattern history update and/or branch target buffer update may be determined when the instruction decoding unit 108 and/or the instruction execution unit 106 after decoding and/or execution of a branch instruction.

By buffering the updates to the FIFO-memory 508 and updating the pattern history memory 504 and the branch target buffer 506 when no prediction of a next taken branch is in progress (so called background updating), the updating does not interfere with the prediction procedure and therefore does not negatively influence the performance of the branch prediction unit 500.

Mapping of Search Program Counter to Pattern History Index i and Mapping of Branch Source Address to Branch Target Buffer Index j The mapping of the search program counter to a pattern history index i and the mapping of the branch source address to a branch target buffer index j may be performed in different ways that will be described below, cf. FIG. 6.

Single Index Mapping

In some embodiments, the mapping of the search program counter to index i is such that each value of the search program counter that is used to access the pattern history memory 504 is associated with a single index i.

The mapping of the branch source address to the index j of the branch target buffer may also be a single mapping, i.e. such that the branch source address $A_0, \ldots, A_{N-1}$ that is used to access the branch target buffer 506 is associated with a single index j.

By mapping the search program counter and the branch source address to a single index i, and single index j, respectively, the power consumption can be reduced or minimized as compared to the case when the search program counter and/or the branch source address are mapped to multiple indices, because such mapping to multiple indices will require a policy that determines which of the indices to be used causing the power consumption to increase. Further, a mapping to single indices provides for a cheap implementation. However, mapping the search program counter and/or the branch source address to multiple indices may lead to better branch prediction and therefore requiring fewer pipeline flushes, which in turn may result in reduced power consumption.

By mapping the search program counter and the branch source address to different indices, i.e., to index i and index j, respectively, the size of the pattern history memory 504 and the branch target buffer 506, could be tuned or optimized to the size required.

Multiple Indices Mapping

In some embodiments, the mapping of the search program counter to index i is such that each value of the search program counter that is used to access the pattern history memory 504 is associated with multiple indices i.

The mapping of the branch source address to the index j of the branch target buffer may also be a multiple mapping, i.e. such that the branch source address $A_0, A_{N-1}$ that is used to access the branch target buffer 506 is associated with multiple indices j.

In some embodiments comprising multiple indices mapping, a policy is used to determine which one of the plurality of indices to use for accessing the pattern history memory 504 or the branch target buffer 506.

As an example, a policy may say that the index referring to an empty entry is to be used when storing new data in the pattern history memory 504 and/or the branch target buffer 506. However, as another example, a policy may say that the entry comprising data produced in a specific time window is to be used when retrieving data from the pattern history memory 504 and/or the branch target buffer 506. By time-stamping data when storing data in the pattern history memory 504, it is possible to determine which one of the entries comprises the required data and to retrieve that data.

By mapping a search program counter to multiple indices i of the pattern history memory 504, the likeliness that two entries that are to be written to the pattern history memory 504 will map to the same index and overwrite one another is smaller than in the case when the search program counter is mapped to a single index i of the pattern history memory 504. The same is true for the mapping of branch source address to multiple indices j of the branch target buffer 506.

As described above, by mapping the search program counter and the branch source address to different indices, the size of the pattern history memory 504 and the branch target buffer 506, could be tuned or optimized to the size required.

This may be expressed in an alternative way by referring to the number of entries in the pattern history table 504 and the branch target buffer 506, respectively. Assume the pattern history memory 504 has as a pointer the search program counter, is indexed with index i and has n entries. Assume also that the branch target buffer 506 has as a pointer the branch source address, is indexed with index j, and has m entries. Further, every index i is associated with multiple search program counters, and every search program counter is associated with either a single index i or multiple indices i's (i.e. the two mapping alternatives previously described, wherein the association with multiple indices i's can lead to less overwrites). Furthermore, every index j is associated with multiple branch source addresses, and every branch source address is associated with either a single index j or multiple indices j's (i.e. the two mapping alternatives previously described, wherein the association with multiple indices j's can lead to less overwrites). The tuning or optimization potential may then be described as allowing the number of entries n and m to be different.

Decoupled Branch Prediction

The prediction of a next taken branch may be separated from the fetching of instructions from an instruction memory. This means that the branch prediction unit 500 operates autonomously and separated from the instruction fetching unit 102. This is also referred to as the decoupled branch prediction and will be described in more detail below with reference to FIG. 3 and FIG. 4.

Figure 3:
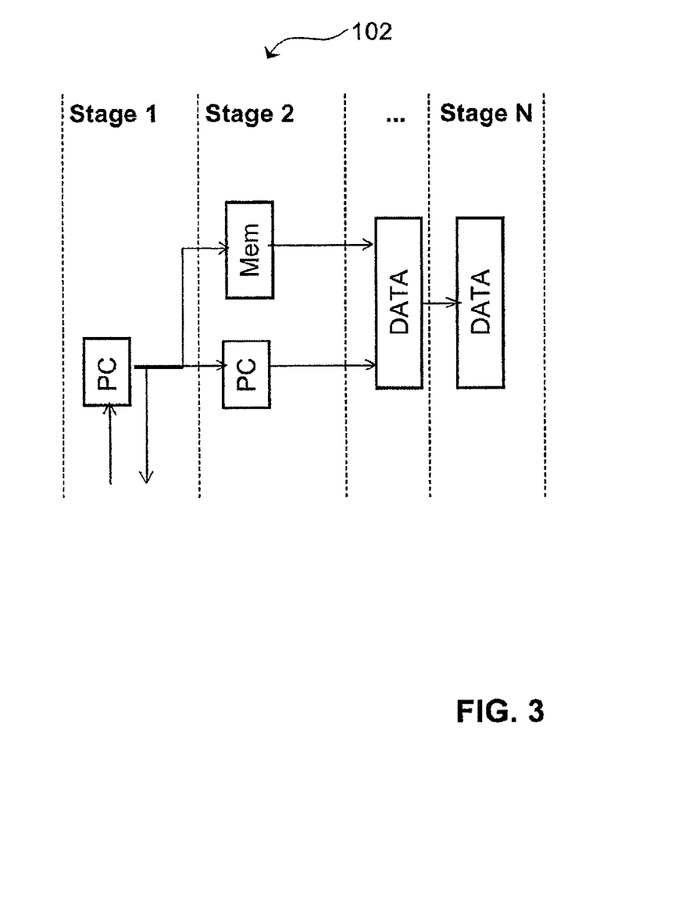
FIG. 3 is a schematic functional block diagram illustrating embodiments of stages in an instruction fetch unit.

FIG. 3 depicts embodiments of processing stages comprised in the instruction fetch unit 102.

In a first processing stage, stage 1, a program counter PC is received from a pipeline control logical circuit (not depicted) in the Front End Unit 101 or from the branch prediction unit 500 (not shown in this figure). When the program counter PC is received from the branch prediction unit 500, the program counter PC is the branch target outputted from the branch prediction unit 500, as previously described under action 208 above.

Further, in stage 1, the program counter PC is transmitted from the instruction fetch unit 102 to the branch prediction unit 500. By means of the program counter, the branch prediction unit 500 may start a prediction of a next taken branch instruction. This relates to action 201 described above.

In a second processing stage, stage 2, the instruction fetch unit 102 fetches an instruction from a functional memory unit, denoted Mem in FIG. 3, by means of the program counter. The functional memory unit corresponds to the instruction memory 104 in FIG. 1.

In subsequent processing stages, stage 3 to stage N, the instruction fetch unit 103 processes data comprised in the fetched instruction. The instruction fetch unit 102 may perform some additional operations, such as expansion or alignment correction of the instruction data until finally in stage N it communicates the data to the FIFO memory 106.

Figure 4:
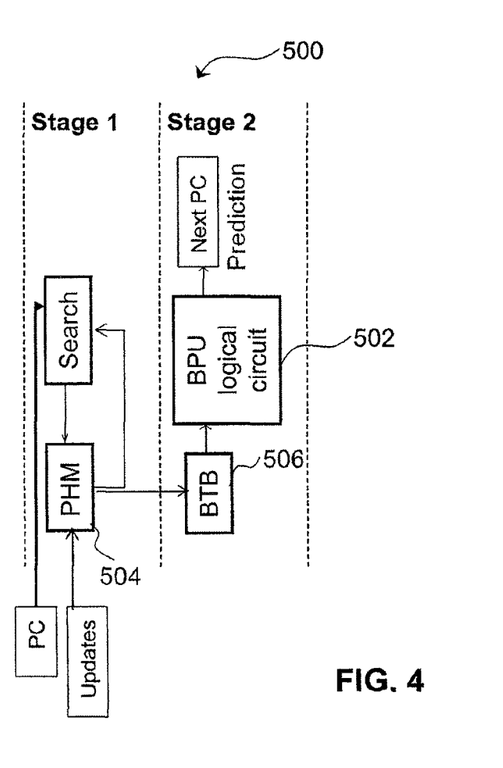
FIG. 4 is a schematic functional block diagram illustrating embodiments of stages in a branch prediction unit.

FIG. 4 depicts embodiments of processing stages comprised in the branch prediction unit 500.

In a first processing stage, stage 1, a program counter PC is received in the branch prediction unit 500. This relates to action 201 previously described. In FIG. 4 it is illustrated that the program counter is received in a functional search unit, denoted Search, configured to search the pattern history memory 504 and to retrieve the branch source address of a first found predicted taken branch instruction.

In some embodiments, the functional search unit is configured to perform action 201 to action 206 previously described. The functional search unit may correspond to or be comprised in a branch prediction logical circuit 502.

In a second processing stage, stage 2, the branch prediction logical circuit 502 performs the actions 207-209 previously described. Thus, the branch prediction logical circuit 502 indexes the branch target buffer 406 by means of the retrieved branch source address and retrieves a branch target for the retrieved branch source address from the branch target buffer 506. Further, the branch prediction logical circuit 502 outputs the branch target as a next program counter.

FIG. 5 depicts embodiments of the branch prediction unit 500 for prediction of a next taken branch instruction. As previously mentioned the branch prediction unit 500 is comprised in the processing unit 100. The branch prediction unit 500 may according to some embodiments be configured to perform the prediction during e.g. two clock cycles of the processing unit 100. However, in other embodiments, the prediction may be performed during another number of clock cycles, such as e.g. one clock cycle, or n clock cycles, where n is an arbitrary integer, just to mention some non-limiting examples.

Since the branch prediction unit 500 is configured to use search program counters that after each search program counter increment during the search process point to instruction memory word addresses, as described above, it is possible for the branch prediction unit 500 to handle instructions of fixed size and instructions of variable sizes.

During every unstalled clock cycle of the processing unit 100, the branch prediction unit 500 may be configured to provide the predictions for the branches of all instructions in an instruction memory word up until the first predicted taken branch. Thus, the branch prediction unit 500 may be configured to handle multiple instructions simultaneously. Thereby, the branch prediction unit 500 may be configured to keep up with an unstalled pipeline of the processing unit 100 that uses variable instruction sizes.

The branch prediction unit 500 comprises a pattern history memory 504 comprising a number of branch source addresses $A_0, \ldots, A_{N-1}$ and a number of branch indicators $BI_{0,0}$-$BI_{N-1,K}$. The branch indicator $BI_{0,0}$-$BI_{N-1,K}$ is configured to indicate at least one predicted taken branch instruction for a branch source address $A_0, \ldots, A_{N-1}$. The pattern history memory 504 will be described in more detail below with reference in FIG. 6.

The branch prediction unit 500 comprises further a branch target buffer 506 comprising a number of branch targets $Target_0, \ldots, Target_{M-1}$. The branch target buffer 506 will be described in more detail below with reference to FIG. 6.

Furthermore, the branch prediction unit 500 comprises a branch prediction logical circuit 502. The branch prediction logical circuit 502 is connected to the pattern history memory 504 and to the branch target buffer 506.

The branch prediction logical circuit 502 is configured to receive a program counter corresponding to the address of an instruction and to determine a search program counter based on the received program counter. The branch prediction logical circuit 502 may receive the program counter from the instruction fetch unit 102.

In some embodiments, the branch prediction logical circuit 502 is configured to start the prediction of a next taken branch instruction upon reception of a new branch signal indicating that the prediction of a next taken branch instruction has to be performed, e.g. when an instruction branch has been predicted as taken.

By means of the search program counter, the branch prediction logical circuit 502 is configured to find in the pattern history memory 504 at least one branch indicator $BI_{0,0}$-$BI_{N-1,K}$. The at least one branch indicator $BI_{0,0}$-$BI_{N-1,K}$ is configured to indicate at least one predicted taken branch instruction that is comprised in an execution path. I In some embodiments, the branch prediction logical circuit 502 is configured to find at least one branch indicator $BI_{0,0}$-$BI_{N-1,K}$ comprised in the pattern history memory 504 concurrently for a plurality of instructions comprised in the instruction memory word.

The branch prediction logical circuit 502 may be configured to find the at least one branch indicator $BI_{0,0}$-$BI_{N-1,K}$ in the pattern history memory 504 by mapping the search program counter to a pattern history index i. By means of the pattern history index i, the branch prediction logical circuit 502 may find the at least one branch indicator $BI_{0,0}$-$BI_{N-1,K}$. The at least one branch indicator $BI_{0,0}$-$BI_{N-1,K}$ may be comprised in the entry of the pattern history memory 504 corresponding to the pattern history index i.

In some embodiments, the branch prediction logical circuit 502 is configured to map the search program counter to a single pattern history index i or to multiple pattern history indices i, as previously described.

The branch prediction logical circuit 502 is further configured to select a first found branch indicator $BI_{0,0}$-$BI_{N-1,K}$ as an indication of a first predicted taken branch instruction in the execution path, and to, by means of the first found branch indicator $BI_{0,0}$-$B_{N-1,K}$, retrieve a branch source address $A_0, \ldots, A_{N-1}$ of the first predicted taken branch instruction from the pattern history memory 504.

When the retrieved branch source address $A_0, \ldots, A_{N-1}$ is the nearest branch source address to the search program counter, the branch prediction logical circuit 502 is configured to index the branch target buffer 506 by means of the retrieved branch source address ($A_0, \ldots, A_{N-1}$).

In some embodiments, the branch prediction logical circuit 502 is configured to index the branch target buffer 506 by mapping the retrieved branch source address $A_0, \ldots, A_{N-1}$ to a branch target buffer index j.

The branch prediction logical circuit 502 may be configured to map the retrieved branch source address $A_0, \ldots, A_{N-1}$ to a single branch target buffer index j or to multiple branch target buffer indices j.

By means of the branch target buffer index j, the branch prediction logical circuit 502 may find, in the branch target buffer 506, the branch target $Target_0, \ldots, Target_{M-1}$ for the retrieved branch source address $A_0, \ldots, A_K$. The branch target $Target_0, \ldots, Target_{M-1}$ may be comprised in the entry of the branch target buffer 506 corresponding to the branch target buffer index j.

The branch prediction logical circuit 502 is further configured to retrieve a branch target $Target_0, \ldots, Target_{M-1}$ from the branch target buffer 506 and to output the retrieved branch target $Target_0, \ldots, Target_{M-1}$ as a next program counter. When the next program counter has been outputted, the branch prediction logical circuit 502 is configured to stop or pause the prediction of a next taken branch instruction until a new branch signal is received.

In some embodiments, when the retrieved branch source address $A_0, \ldots, A_{N-1}$ is not the branch source address nearest to the search program counter, the branch prediction logical circuit 502 is further configured to continue searching.

The branch prediction unit 500 may further comprise or be connected to a FIFO memory 508. The FIFO memory 508 is configured to store at least one pattern history update to the pattern history memory 504 or at least one branch target buffer update to the branch target buffer 506.

The at least one pattern history update relates to at least one new or updated branch source address or to at least one new or updated taken branch instruction. The at least one branch target buffer update relates to at least one new or updated branch target $Target_0, \ldots, Target_{M-1}$.

In some embodiments, the branch prediction logical circuit 502 is configured to buffer at least one pattern history update to the pattern history memory 504 in the FIFO memory 508 and to update the pattern history memory 504 with the buffered at least one pattern history update when the pattern history memory 504 is not searched. Further, the branch prediction logical circuit 502 may be configured to buffer at least one branch target buffer update to the branch target buffer 506 in the FIFO memory 508 and to update the branch target buffer 506 with the buffered at least one branch target buffer update when the branch target buffer 506 is not indexed.

The branch prediction unit 500 may further comprise or be connected to a next branch memory 510 configured to store a nearest found instruction branch, as previously described.

Embodiments herein do also relate to a processing unit 100 comprising the branch target unit 500, to an integrated circuit comprising the processing unit 100, and to a communication device comprising the integrated circuit. Such communication device may comprise e.g. a base station, a network node, a relay station, a user equipment or any other device configured for communication.

Figure 6:
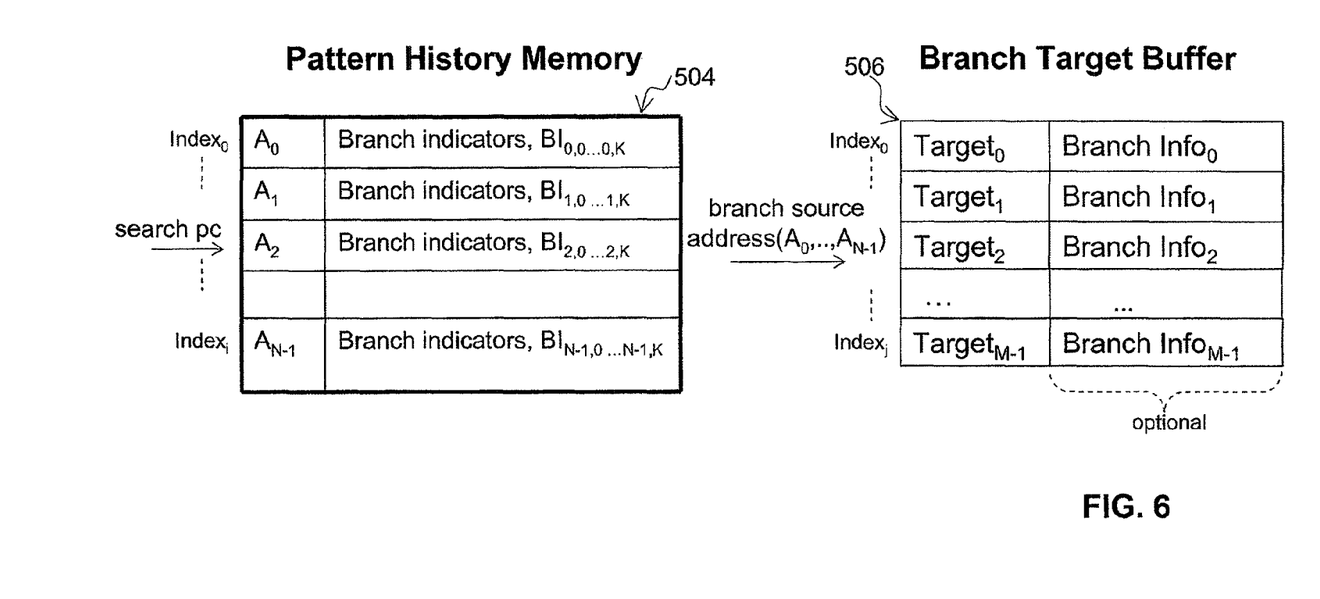
FIG. 6 shows schematic embodiments of a pattern history memory and a branch target buffer.

FIG. 6 depicts embodiments of the pattern history memory 504 and the branch target buffer 506.

As previously mentioned, the pattern history memory 504 comprises the at least one branch indicator $BI_{0,0}$-$BI_{N-1,K}$ relating to at least one previously taken branch instruction, i.e. to at least one branch instruction taken in the history, thereof the name pattern history. This history information can be used in the prediction of upcoming branch instructions, meaning that the branch prediction is based on previously taken branch instructions. Thus, the branch indicator $BI_{0,0}$-$BI_{N-1,K}$ is configured to indicate at least one predicted taken branch instruction for a branch source address $A_0, \ldots, A_{N-1}$. However, as symbolized by the index K in $BI_{0,0}$-$BI_{N-1,K}$, K branch indicators may exist for each branch source address $A_0, \ldots, A_{N-1}$. This means that for each branch source address as a starting address in an instruction memory word, a plurality of branch instructions comprised in the instruction memory word may be indicated in the pattern history memory 504. However, it should be understood that the number of branch indicators for each branch source address may be different, i.e. the value of K may be different for the different branch source addresses $A_0, \ldots, A_{N-1}$.

However, according to some embodiments, when there are no branches to be found in the pattern history memory 504, the search may end and the branch prediction unit 500 may enter idle mode as soon as it arrives at that conclusion.

In some embodiments, the pattern history memory 504 is arranged as a table and referred to as a pattern history table 504. The pattern history table 504 may be a concise list comprising an ordered set of values. However, it should be understood that pattern history information could be stored in another suitable way, such as an unordered set of values with identifiers, wherein the identifiers are configured to identify the values comprised in the unordered set.

As previously mentioned, the branch target buffer 506 comprises a number of branch targets $Target_0, \ldots, Target_{M-1}$. In some embodiments, the branch target buffer 506 is configured to comprise branch target information Branch $Info_0, \ldots,$ Branch $Info_{M-1}$ such as branch instruction type, a branch source address, and information about whether the branch is taken or not.

The branch target $Target_0, \ldots, Target_{M-1}$ may comprise the instruction address of the next predicted taken branch instruction or a pointer to the next predicted taken branch instruction.

The pattern history memory 504 and the branch target buffer 506 may be realized as processor caches configured to store and provide frequently used information. The pattern history memory 504 and the branch target buffer 506 may be configured to provide information in a single clock cycle.

In FIG. 6 it is schematically illustrated that the search program counter is used to access the pattern history memory 504, and that the branch source address retrieved from the pattern history memory 504 is used to access the branch target buffer 506. Further, as previously described, the search program counter may be mapped to at least one of $index_0$-$index_i$ of the pattern history memory 504 and the retrieved branch source address may be mapped to at least one of $index_0$-$index_j$ of the branch target buffer 506.

When using the word "comprise" or "comprising" it shall be interpreted as non-limiting, i.e. meaning "consist at least of".

When using the word "action"/"actions" it shall be interpreted broadly and not to imply that the actions have to be carried out in the order mentioned. Instead, the actions may be carried out in any suitable order other than the order mentioned. Further, some action/actions may be optional.

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method in a branch prediction unit for prediction of a next taken branch instruction in a processing unit comprising the branch prediction unit, the method comprises:
receiving a program counter corresponding to the address of an instruction;
determining a search program counter based on the received program counter;
using the search program counter to find in a pattern history memory at least one branch indicator configured to indicate at least one predicted taken branch instruction that is comprised in an execution path;
selecting a first found branch indicator as an indication of a first predicted taken branch instruction in an execution path;
using the first found branch indicator to retrieve from the pattern history memory, a branch source address of the first predicted taken branch instruction; and
repeating the finding, selecting, and retrieving steps until the retrieved branch source address is the branch source address with an address difference of a single byte to the address of the search program counter or until all entries in the pattern history memory have been visited, wherein when the retrieved branch source address is the branch source address with the address difference of the single byte to the address of the search program counter or until when all entries in the pattern history memory have been visited, the method further comprising
indexing a branch target buffer using the retrieved branch source address;
outputting a branch target retrieved from the branch target buffer as a next program counter; and
stopping prediction of a next taken branch instruction.

2. The method of any of claim 1, wherein the finding of the at least one branch indicator in the pattern history memory for at least one branch indicator is performed concurrently, during one clock cycle, for a plurality of instructions comprised in the instruction memory word.

3. The method of claim 1, further comprising:
buffering at least one update to the pattern history memory or at least one update to the branch target buffer in a FIFO memory; and
updating the pattern history memory or the branch target buffer with the buffered at least one update when the pattern history memory or the branch target buffer is not searched.

4. The method of claim 1, wherein the method is performed during two clock cycles of the processing unit.

5. A branch prediction unit for prediction of a next taken branch instruction in a processing unit comprising the branch prediction unit, the branch prediction unit comprises:
a pattern history memory comprising a number of branch source addresses and a number of branch indicators, wherein the branch indicator is configured to indicate at least one predicted taken branch instruction for a branch source address;
a branch target buffer comprising a number of branch targets; and
branch prediction logical circuit connected to the pattern history memory and to the branch target buffer, wherein the branch prediction logical circuit is configured to:
receive a program counter corresponding to a start address of an instruction memory word;
determine a search program counter based on the received program counter;
using the search program counter to find in the pattern history memory at least one branch indicator, wherein the at least one branch indicator is configured to indicate at least one predicted taken branch instruction that is comprised in an execution path;
select a first found branch indicator as an indication of a first predicted taken branch instruction in the execution path;
using the first found branch indicator to retrieve from the pattern history memory, a branch source address of the first predicted taken branch instruction;
repeating the finding, selecting, and retrieving until the retrieved branch source address is the branch source address with an address difference of a single byte to the address of the search program counter, wherein when the retrieved branch source address is the branch source address with the address difference of the single byte to the address of the search program counter or until when all entries in the pattern history memory have been visited, the branch prediction logical circuit is further configured to index the branch target buffer using the retrieved branch source address;

output a retrieved branch target from the branch target buffer as a next program counter; and stop prediction of a next taken branch instruction.

6. The branch prediction unit of claim 5, wherein the branch prediction logical circuit is configured to map the search program counter to multiple pattern indices, I, wherein at least one branch indicator comprised in the pattern history memory is found concurrently for a plurality of instructions comprised in the instruction memory word.

7. The branch prediction unit of claim 5, wherein the branch prediction logical circuit is configured to find the at least one branch indicator in the pattern history memory by:

mapping the search program counter to a pattern history index i; and using the pattern history index i to find the at least one branch indicator, wherein the at least one branch indicator is comprised in the entry of the pattern history memory corresponding to the pattern history index i.

8. The branch prediction unit of claim 5, is:

a FIFO memory configured to store at least one update to the pattern history memory or to the branch target buffer; and wherein the branch prediction logical circuit is configured to buffer at least one update to the pattern history memory or the branch target buffer in the FIFO memory, and configured to update the pattern history memory or the branch target buffer with the buffered at least one update when the pattern history memory is not searched or when the branch target buffer is not indexed.

9. The branch prediction unit of claim 8, wherein the at least one update relates to at least one new or updated branch source address, to at least one new or updated taken branch instruction or to at least one new or updated branch target.

10. The branch prediction unit of claim 5, wherein the branch prediction logical circuit is configured to start the prediction of a next taken branch instruction upon reception of a new branch signal indicating that the prediction of a next taken branch instruction has to be performed.

11. A processing unit comprising a branch prediction unit for prediction of a next taken branch instruction in a processing unit comprising the branch prediction unit, the branch prediction unit comprises:

a pattern history memory comprising a number of branch source addresses and a number of branch indicators, wherein the branch indicator is configured to indicate at least one predicted taken branch instruction for a branch source address;

a branch target buffer comprising a number of branch targets; and branch prediction logical circuit connected to the pattern history memory and to the branch target buffer, wherein the branch prediction logical circuit is configured to:

receive a program counter corresponding to a start address of an instruction memory word;

determine a search program counter based on the received program counter;

using the search program counter to find in the pattern history memory at least one branch indicator, wherein the at least one branch indicator is configured to indicate at least one predicted taken branch instruction that is comprised in an execution path;

select a first found branch indicator as an indication of a first predicted taken branch instruction in the execution path;

using the first found branch indicator to retrieve from the pattern history memory, a branch source address of the first predicted taken branch instruction;

repeating the finding, selecting, and retrieving until the retrieved branch source address is the branch source address with an address difference of a single byte to the address of the search program counter, wherein when the retrieved branch source address is the branch source address with the address difference of the single byte to the address of the search program counter or until when all entries in the pattern history memory have been visited, the branch prediction logical circuit is further configured to index the branch target buffer using the retrieved branch source address;

output a retrieved branch target from the branch target buffer as a next program counter; and stop prediction of a next taken branch instruction.

* * * * *